United States Patent [19]
Saijonmaa et al.

[11] Patent Number: 5,706,285
[45] Date of Patent: Jan. 6, 1998

[54] NETWORK INTERFACING METHOD AND A NETWORK INTERFACE FOR A DIGITAL TRANSMISSION NETWORK

[75] Inventors: Jaakko Saijonmaa, Espoo; Seppo Pyhälammi, Helsinki, both of Finland

[73] Assignee: Nokia Telecommunications Oy, Espoo, Finland

[21] Appl. No.: 318,787
[22] PCT Filed: Mar. 30, 1993
[86] PCT No.: PCT/FI93/00130
§ 371 Date: Sep. 30, 1994
§ 102(e) Date: Sep. 30, 1994
[87] PCT Pub. No.: WO93/20635
PCT Pub. Date: Oct. 14, 1993

[30] Foreign Application Priority Data

Apr. 2, 1992 [FI] Finland ................... 921462

[51] Int. Cl.⁶ ................... H04L 12/56
[52] U.S. Cl. ................... 370/395; 370/391
[58] Field of Search ................... 370/84, 79, 82, 370/85.1, 94.1, 60, 60.1, 94.2, 112, 102, 103, 99, 101.1, 229, 232, 233, 234, 235, 358, 360, 389, 391, 395, 396, 399, 421, 437, 451, 535, 536–539, 541, 543–545; 375/354, 356, 372, 363; 341/61; 348/391, 393

[56] References Cited

U.S. PATENT DOCUMENTS

| | | | |
|---|---|---|---|
| 4,790,015 | 12/1988 | Callens et al. | 375/240 |
| 5,065,396 | 11/1991 | Castellano et al. | 370/84 |
| 5,091,907 | 2/1992 | Wettengel | 370/84 |
| 5,103,447 | 4/1992 | Takiyasu et al. | 370/84 |
| 5,130,984 | 7/1992 | Cisneros | 370/60 |
| 5,297,136 | 3/1994 | Soprano et al. | 370/84 |
| 5,353,285 | 10/1994 | Van Der Plas et al. | 370/84 |
| 5,490,252 | 2/1996 | Macera et al. | 370/85.13 |

FOREIGN PATENT DOCUMENTS

| | | |
|---|---|---|
| 0446956 | 9/1991 | European Pat. Off. . |
| 0468818 | 1/1992 | European Pat. Off. . |

*Primary Examiner*—Douglas W. Olms
*Assistant Examiner*—Dang Ton
*Attorney, Agent, or Firm*—Cushman Darby & Cushman Intellectual Property Group of Pillsbury Madison & Sutro LLP

[57] ABSTRACT

A method for establishing a user-network interface in a digital transmission network for a cell-based digital 140 or 155 Mbit/s ATM signal, and a network interface embodying the method. The interface includes an input buffer controlled by a predetermined policing function for receiving the cell-based signal and adapting the transmission speed of the signal to the actual transmission speed of the transmission network; a mapper for forming cell blocks of N consecutive cells from the cell-based signal and for adding N overhead bytes to each cell block; and a multiplexer for multiplexing the output signal of the mapper byte by byte into N separate output signals of about 1.5 Mbit/s, 2 Mbit/s, 6 Mbit/s or 8 Mbit/s.

22 Claims, 4 Drawing Sheets

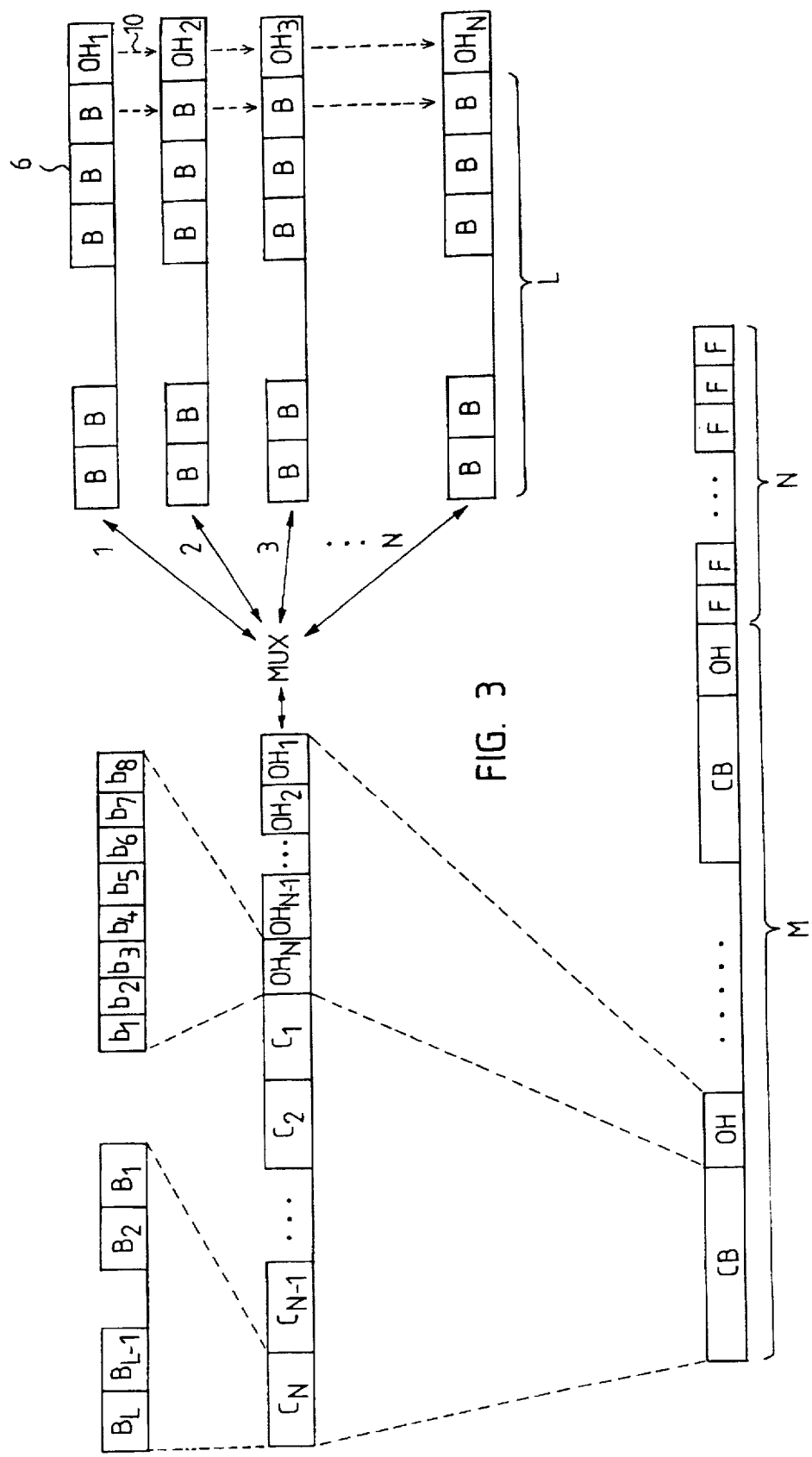

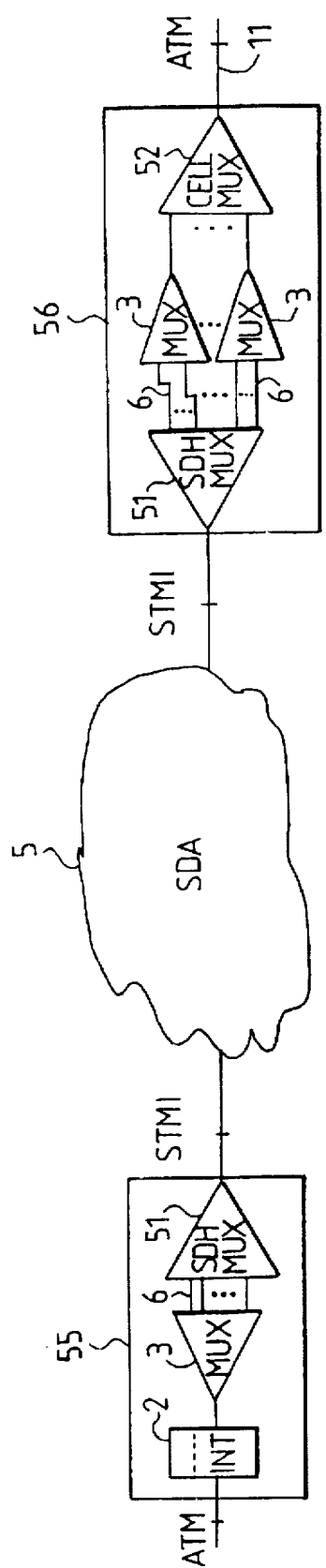
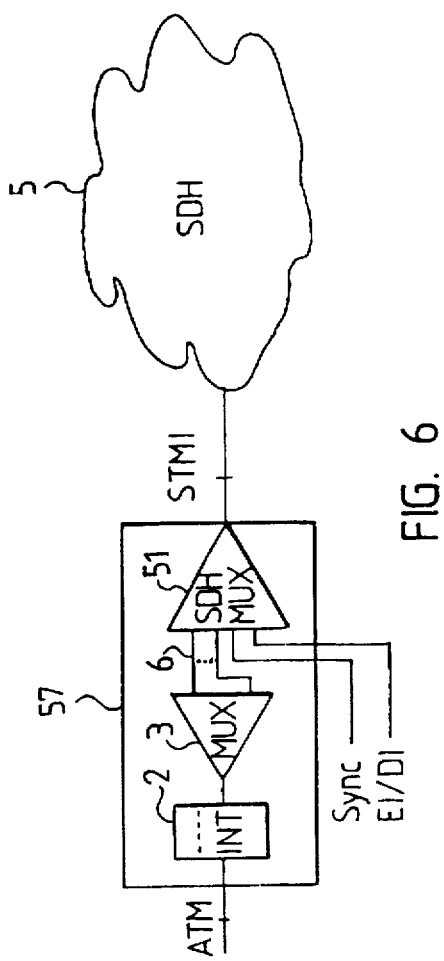
FIG. 5
FIG. 6

NETWORK INTERFACING METHOD AND A NETWORK INTERFACE FOR A DIGITAL TRANSMISSION NETWORK

FILED OF THE INVENTION

The invention relates to a method for establishing a user-network interface in a digital transmission network for a cell-based digital signal comprising cells of fixed length and having a high nominal bit rate, preferably 140 or 155 Mbit/s for an ATM signal.

BACKGROUND OF THE INVENTION

Cell-based data transmission at high bit rates is emerging in the public data and telecommunication networks with the standardization of the international ATM (Asynchronous Transfer Mode) user-network interfaces (UNI) and network-network interfaces (NNI). The asynchronous transfer mode ATM is based on a high-speed packet switched transmission technique where data is transferred in packets of fixed length, called cells in the ATM technique. The cell typically comprises an overhead of five octets and a payload of 48 octets. Cells belonging to different links are identified on the basis of their overhead. The ATM technique allows the transmission capacity to be utilized extremely flexibly. In addition, the packet switched transmission technique allows a variable band-width and dynamic channel allocation. The protocol used in the ATM technique is as simple as possible in order that the required transmission operations could be realized at very high speeds. The ATM is independent of the technique used for the transmission of cells, and so ATM cells can be transferred in the present plesiochronous transmission systems, in the transmission systems according to the synchronous hierarchical system SDH, or they may be transmitted as such e.g. in an optical fiber.

ATM interfaces are being standardized for the bit rates 140 Mbit/s (E4), 155 Mbit/s (SDH STM-1), 44 Mbit/s (D3) and 53 Mbit/s (SONET). Cell-based E1/D1 (2/1.5 Mbit/s), E2/D2 (8/6 Mbit/s) and E3/D3 (34/44 Mbit/s) standard interfaces are being specified for MAN networks. Many new applications will require a flexible bit rate ranging between E1/D1 and E3/D3, particularly from 4 to 16 Mbit/s for local area networks (LAN) links and for compressed digital video.

A high-speed 140/155 Mbit/s ATM interface can be used for a wide variety of services; in practice, however, the transfer of this type of signal over a subscriber network requires a separate optical fiber network, being thus expensive. The transfer of the ATM signal at 140 Mbit/s is not possible with copper twisted pair cables in the subscriber network, not even when the information signal itself (payload) has a lower bit rate. The transfer of a standard ATM signal in the SDH transmission system requires a complete VC-4 path (VC=virtual container), again even in cases where the transmission speed of net information would be low.

SUMMARY OF THE INVENTION

The object of the invention is a high-speed cell-based user-network interface complying with the standards towards the user and allowing an efficient transmission of the payload of the high-speed cell-based digital signal over a transmission network.

This is achieved by means of a method of the type described in the foregoing Background section, which according to the invention is characterized by adapting the rate of the cell-based signal by a policing function to an actual transmission speed lower than said nominal bit rate; and mapping the rate-adapted cell-based signal into a group of lower-speed transmission signals of about 1.5 Mbit/s, 2 Mbit/s, 6 Mbit/s or 8 Mbit/s for transmission over the transmission network.

The basic idea of the present invention is to utilize a standard cell-based high-speed (e.g. 140/155 Mbit/s) interface towards the user while adjusting the service bit rate to a fraction of the nominal high bit rate by using a policing function and while mapping the rate-adjusted payload signal into a group of standard transmission signals of a lower transmission speed. In the invention, a single high-speed cell-based signal is multiplexed at the transmission end into a number of lower-speed transmission signals, which allows an efficient utilization of the existing E1/D1, E2/D2 transmission channels, thus avoiding the use of separate optical fiber networks. SDH/SONET transmission networks also offer a very flexible and versatile network for routing this kind of low-speed transmission signals, such as E1/D1, over the transmission network. The invention allows this property to be utilized even in the transfer of cell-based high-speed signals. Even though the invention continuously offers a high-speed standard interface to the user, a lower transmission capacity can be used flexibly on the transmission network side in accordance with the actual payload to be transferred, whereas it has previously been necessary to dimension the whole transmission link in accordance with the transmission speed of the used interface. At the reception end the separate received transmission signals are restored into a single high-speed cell-based signal, which is applied via a standard high-speed interface to the user. Accordingly, only the standard user-network interface is visible to the users at both ends of the link while the actual link is transparent to the user.

The invention also relates to a user-network interface in a digital transmission network for a cell-based digital signal comprising cells of fixed length and having a high nominal bit rate. The interface according to the invention comprises an input buffer means for receiving and buffering the cell-based signal; a policing means for controlling said buffer means to adapt the rate of the received cell-based signal to the actual transmission speed of the transmission network; a mapping means for forming cell blocks of N consecutive cells from the cell-based signal and for adding N overhead bytes to each cell block; a first multiplexing means for multiplexing the output signal of the mapping means byte by byte into N separate output signals of about 1.5 Mbit/s, 2 Mbit/s, 6 Mbit/s or 8 Mbit/s.

BRIEF DESCRIPTION OF THE DRAWINGS

The invention will be described in the following in greater detail by means of illustrating embodiments with reference to the attached drawings, in which.

FIGS. 3 and 4 illustrate the mapping and multiplexing of a cell-based high-speed signal according to the invention to a plurality of E1/D1 signals; and FIGS. 5 and 6 are block diagrams illustrating transmission systems where the user-network interface according to the invention comprises an SDH multiplexer.

DETAILED DESCRIPTION OF THE INVENTION

The present invention relates generally to the transfer of any high-speed cell-based digital signal consisting of cells of fixed length over a transmission network by using a plurality of lower-speed transmission signals to which the actual payload of the cell-based signal is multiplexed. Another typical feature of the invention is that it provides a standard high-speed electrical interface towards the user. In the preferred embodiment of the invention the cell-based signal refers to cell-based signals according to the asynchronous transfer mode ATM, consisting of cells each comprising an overhead typically of five bytes and an information portion called payload of 48 bytes. Typical standard cell-based high-speed interfaces include E4, STM-1, D3 and SONET having the bit rates 140 Mbit/s, 155 Mbit/s, 44 Mbit/s and 53 Mbit/s, respectively. The 140/155 Mbit/s interface will be described below by way of example.

Transmission signals to which the cell-based signal is multiplexed may be transmission signals E1, D1, E2 or D2 complying with the CCITT specifications G703 or G704 and having the transmission speeds of about 2 Mbit/s, 1.5 Mbit/s, 8 Mbit/s and 6 Mbit/s, respectively. The invention will be described below using the lowest hierarchical levels E1 (2 Mbit/s) and D1 (1.5 Mbit/s) as examples, as they seem to suit best the purpose of the invention.

Figure 1:
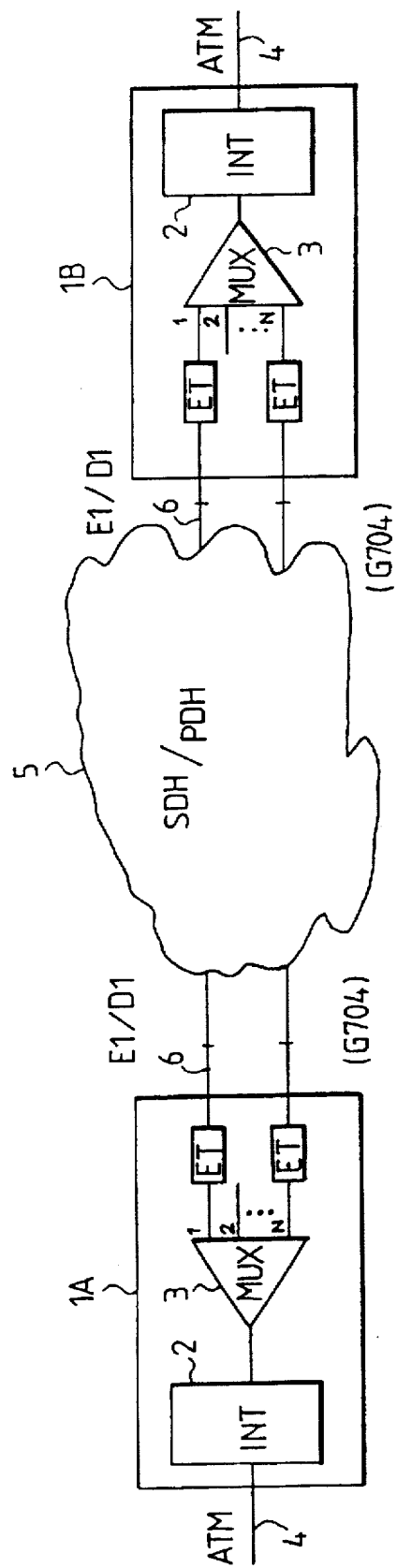
FIG. 1 is a block diagram illustrating a transmission system comprising cell-based interfaces according to the invention to a transmission network.

In the transmission system of FIG. 1, high-speed 140/155 Mbit/s cell-based user interfaces 4 are connected via network interfaces 1A and 1B according to the invention to a transmission network, which in this example is a transmission network complying with the synchronous digital hierarchy SDH or the plesiochronous digital hierarchy PDH. The network interfaces 1A and 1B are identical with each other. In the network interface 1A an interfacing and rate adjusting unit 2 provides a standard high-speed cell-based interface 4 towards the user, whereas it adjusts the actual service bit rate to a fraction of the nominal high bit rate 140/155 Mbit/s by utilizing a policing function to limit the bit rate to be applied to a multiplexer 3 so that it matches the actual transmission capacity. At simplest, the policing function may comprise a mere freely overflowing data buffer, in which case the subscriber equipment using the network interface is aware of the highest permissible service bit rate in advance. In more advanced cases, the policing function may be controlled by a network management, to which the subscriber equipment may also be connected. The policing function may also be controlled directly by signalling from the subscriber interface. The multiplexer 3 maps and multiplexes the adjusted payload signal into a group of 2 Mbit/s transmission signals 6 complying with the CCITT specification G704, and transfers the payload in the transmission signals over a transmission network 5. At the reception end, the N transmission signals 6 received over the transmission network 5 are correspondingly demultiplexed and mapped back to the cell-based signal, the speed of which is adapted in the unit 2 to the bit rate 140/155 Mbit/s of the ATM interface.

The multiplexing/demultiplexing of the cell-based signal to the group of transmission signals is complicated by various possible anomalous effects in the transmission of several different signals. Such effects include bit errors, delay differences, delay jitter, rerouting, etc., which the mapping and multiplexing function according to the invention should be able to handle.

To provide a feasible system, the multiplexing of the cell-based ATM signal to several transmission signals should preferably fulfil the following requirements.

I. The overall transmission delay should be minimized. This is, of course, in line with minimizing the need of buffering in the multiplexer/demultiplexer 3. To fulfil this requirement the multiplexing of the cells (data packets) into the multiple transmission lines should be done in small enough units, byte by byte, for instance.

II. The receiver should be able to receive and multiplex the multiple transmission signals back to the original cell-based signal even when there exist considerable delay differences between the individual transmission signals due to e.g., different transmission routes, transmission system line buffer states and digital transmission cross connects. Differential phase jitter and wander may also occur, to which the receiver demultiplexer 3 should adapt.

III. Cell synchronization in the receiver should be achieved efficiently (within a few hundreds of milliseconds to avoid the expiration of higher-layer protocol time-outs) in the case of initialization as well as loss of cell synchronization due to bit errors, delay jitter and transmission frame slips in the network. It is essential to get all the transmission signals at the receiver into the right cell synchronization even in cases where the transmission delay differences are more than several cells.

IV. Overhead data due to cell mapping to the transmission signals should be kept at a minimum for a variable number of transmission signals (2–32).

Figure 2:
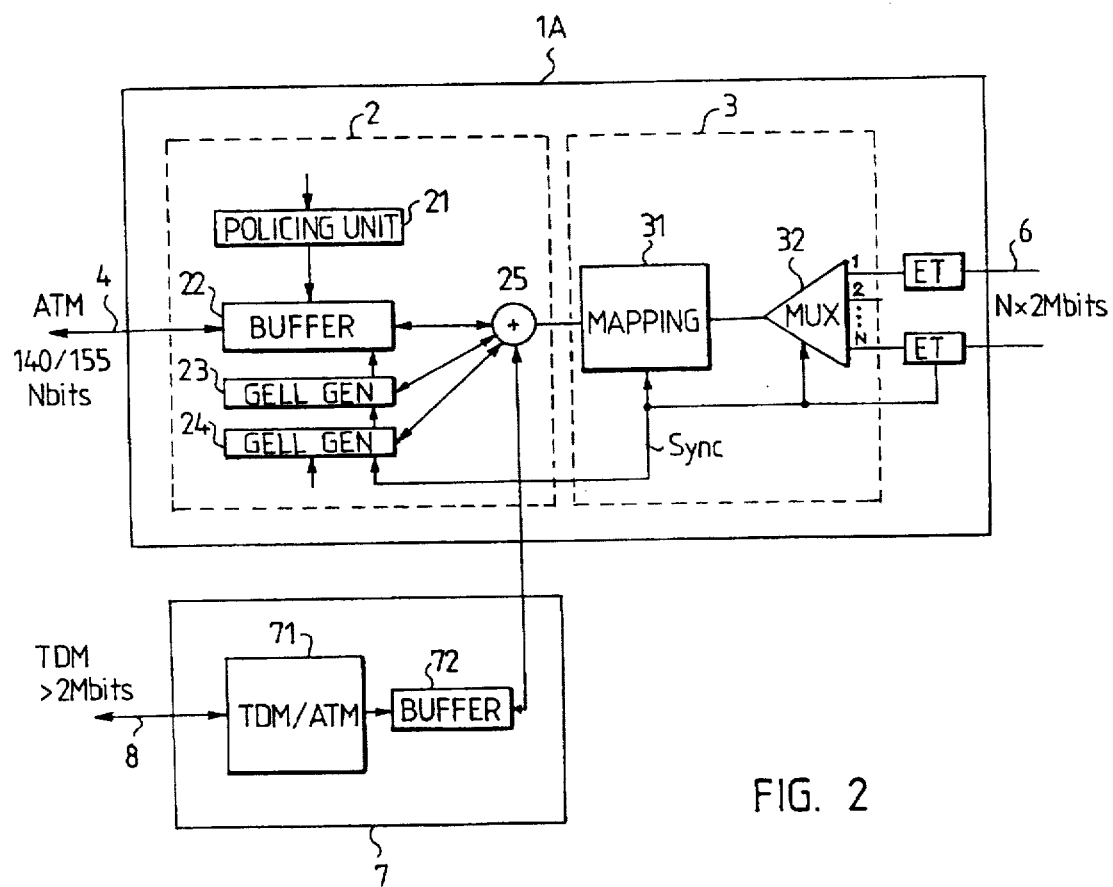
FIG. 2 is a more detailed block diagram illustrating the user-network interface shown in FIG. 1.

FIG. 2 shows a more detailed block diagram of the interface 1A shown in FIG. 1. The cell-based high-speed signal from the ATM interface is routed to an input buffer 22, which, under the control of a policing unit, performs the bit-rate adaptation and regulates inbound traffic according to a policing function known to the user so as to adapt the cell-based signal to the actual transmission speed and capacity of the transmission network. The policing function may be, e.g., the leaky bucket function known per se. The output signal of the buffer 22 is applied to a combinet 25. A cell generator 23 generates empty cells which are combined by the combiner 25 with a cell stream from the buffer 22 so that a constant isochronous cell stream independent of the actual cell rate from the user is applied to the multiplexer 3. Block 2 may further contain a cell generator 24 for combining the transmission management cell stream by the combiner 25 with the cell stream to the multiplexer 3. The generator 24 is used when management information is to be exchanged between the two ends of the transmission link. Optionally the block 2 may also comprise an external cell generator 7 to which the user may apply a desired synchronous or isochronous signal (or signals) having a bit rate of at least 2 Mbit/s. A mapping unit 71 in the generator 7 maps the synchronous TDM transfer frames into the ATM cells in a normal way, and a buffer 72 adjusts the speed of the obtained ATM cell signal such that it can be combined by the combiner 25 with the cell stream to be applied to the multiplexer 3. If desired, this solution allows different types of signals to be transferred over the same link, which decreases the number of required user interfaces and improves the degree of utilization of the transmission link.

In the multiplexer unit 3, a mapping block 31 receives the cell stream from the combiner 25 in a manner to be described below, whereafter a multiplexer 32 multiplexes the mapped cell signal into N 2 Mbit/s transmission signals 6, which are E1 signals complying with the CCITT G704 in this example. FIG. 2 further shows a network terminal ET for each transmission line 6. The network terminal extracts a synchronizing clock sync from the data stream received over the transmission network. The synchronizing signal is used to synchronize all components at the interface 1A, as illustrated in FIG. 2.

The operation of the mapping block 31 and the multiplexer 32 will be described referring to FIGS. 3 and 4.

The data stream received from the combiner 25 is formed into cell blocks CB comprising N consecutive cells $C_1$–$C_N$, and N overhead bytes $OH_1$–$OH_N$ are introduced in front of the cell blocks for cell synchronization to be performed at the receiver. Each cell C comprises L bytes $B_1$–$B_L$, where L is typically 53. In other respects, the content of the cells C is not significant to the invention.

The framed cell signal so obtained is multiplexed in small enough units, in the preferred embodiment of the invention, byte by byte, into N separate 2 Mbit/s transmission signals 6, thus fulfilling Requirement I set forth above. In the preferred embodiment of the invention, consecutive bytes are derived from the framed cell signal in the multiplexing, and each consecutive byte is placed in a different transmission signal 6, beginning from the first transmission signal and then proceeding in accordance with the arrows 10 up to the Nth transmission signal, whereafter one returns to the first transmission signal. As the number N of the transmission signals is equal to the number N of the cells C in each cell block CB and the number N of the overhead bytes OH introduced in front of each cell block, the overhead byte OH occurs at intervals of L bytes with each separate transmission signal 6. Accordingly, the overhead byte rate of the transmission signal 6 is constant B/(L+1), where B is the bit rate of the transmission signal, being independent of the number N. This allows the number N to be changed easily without changing the required hardware. In the case of standard ATM cells, L is 53 bytes and the overhead byte OH occurs in the transmission signal at intervals of 54 bytes, which corresponds to a frequency of 1.920 MHz/54 in the standard 2 Mbit/s transmission signal complying with G704.

The overhead bytes $OH_1$–$OH_N$ introduced in front of the cell block CB in mapping may be used for various purposes, but they at least maintain the serial count of the cell blocks CB. The serial count is incremented by one or by N from one cell block to another, and it maintains the cell and cell block synchronization in the different transmission signals. This ensures that the original cell traffic can be synchronized by signals received from the N transmission lines in the receiver even in cases where there are large delay differences between the transmission signals, which fulfils Requirement II set forth above. E.g., four bits (bits $B_1$–$B_4$) can be used for the cyclic count of the cell blocks, whereby the cyclic count may run from 1 to 16 and be repeated after every 16 cell blocks. The remaining bits $B_5$–$B_8$ of the overhead byte OH can be used for numbering the transmission signals, which allows the multiplexer/demultiplexer to follow an individual transmission signal arrangement.

In order to facilitate the cell synchronization taking place initially at the receiver from the received separate transmission signals, a resynchronization word F of e.g. two bytes is added in one embodiment of the invention at intervals of one cell block CB (at intervals of M×(L+1) bytes) in each individual transmission signal M, where M depends on the resynchronization time requirement and on how much the resynchronization word is allowed to increase the overhead capacity. In practice, this takes place by adding N synchronization words F in front of a group comprising M cell blocks at the mapping stage.

When synchronization is lost from an individual transmission line, the receiver begins to search for a synchronization word F, bit by bit if the transmission signal is a G704 bit stream, or byte by byte, if the transmission signal consists of G704 frames, which gives byte synchronization. When the F word is found, the synchronization word F after M×(L+1) bytes is checked to ensure that the word found first was correct, not an arbitrary word in the information payload.

Feasible values of M would be in the range from 8 to 54. For example, if M=16 and N=10, an ATM (L=53) signal would resynchronize at intervals of 2×(16×54×8 bits)/(2 Mbit/s)=7 ms, which would represent an extra overhead of about (N×16 bits)/(M(L+1)×8=2.3%. In any case the synchronization time is small, in accordance with Requirement 3, and the overhead can be easily kept small, which fulfils Requirement IV.

Inappropriate resynchronization with two consecutive 16-bit resynchronization words will occur with an average probability of $1.7 \times 10^{31 \ 7}$.

In the invention, the receiver of each individual transmission line retains the bit and byte synchronization according to the G703 signal standard and the G704 transmission system frame synchronization words (byte 0). In FIG. 1, the transmission system between the multiplexers/demultiplexers 3 may thus be any standard plesiochronous transmission system and it may use the G704 frame bytes 0 (and 16) as specified in the standards. The cell multiplexer/demultiplexer 3 at the receiver is able to buffer at least one transfer frame (30 bytes) in each individual transmission signal, which allows adaptation to the maximum delay differences and difference variation between the transmission signals, thus fulfilling Requirement II.

As mentioned above, the 2 Mbit/s transmission signals used in the invention can be easily multiplexed by 2 Mbit/s signals to the plesiochronous network, as shown in FIG. 1, or to the STM-1 frames of the SHD system at the user end and central end of the link, as shown in FIG. 5. For the last-mentioned case the user-network interface 55 according to the invention, shown in FIG. 5, comprises the interfacing and rate adjusting unit 2 and the multiplexing unit 3 shown in FIGS. 1 and 2. In the solution of FIG. 5, the interface 55 further comprises an SDH multiplexer 51 which multiplexes the N transmission signals 6 produced by the multiplexer 3 into the STM-1 frames. If the transmission link between the multiplexers/demultiplexers 3 at the ends of the link is an SDH network, the delay differences and jitter of the 2 Mbit/s signals remain within a few bits while there is no kind of frame slip, so that the buffers of the demultiplexer 3 could be considerably smaller at the reception. The management of the SDH network may keep the (N) 2 Mbit/s transmission signals on the same route (in the same virtual container VC-4) throughout the SDH network.

At the user end the standard SDH/PDH multiplexer can be used to multiplex the N transmission signals (N×2 Mbit/s) produced by the multiplexer 3 to other synchronous 2 Mbit/s signals, as illustrated in FIG. 6. In the network interface 57, one or more such signals, which may also be a synchronization signal, are simply applied to the input of the multiplexer 51.

In FIG. 5, block 56 illustrates one way of boosting the operation at the exchange end of the transmission network when it processes groups of N transmission signals according to the invention. The SDH demultiplexer 51 demultiplexes the STM-1 frames received over the network 5 into the original groups of N transmission signals. Each group of N transmission signals has a dedicated multiplexer/demultiplexer 3 for restoring the respective cell-based signal. The cell-based signals produced by the multiplexers 3 are multiplexed by an ATM multiplexer 52 into a signal of a single standard high-speed ATM interface 11.

The drawings and the description related to them are only intended to illustrate the present invention. In their details, the method and the network interface according to the invention may vary within the scope of the attached claims.

We claim:

1. A method for establishing a user-network interface in a digital transmission network for a cell-based digital signal comprising cells of fixed length and having a high nominal bit rate, for an ATM signal, said method comprising the steps of:

adapting the rate of the cell-based signal by a policing function to an actual transmission speed lower than said nominal bit rate; and mapping the rate-adapted cell-based signal into a group of lower-speed transmission signals for transmission over the transmission network, N being an integer which is greater than 2;

said step of mapping comprising the steps of:

a) forming cell blocks of N consecutive cells from the cell-based signal;

b) adding N overhead bytes to each cell block to form a composite signal;

c) multiplexing the composite signal to said N separate transmission signals.

2. The method according to claim 1, wherein said policing function utilizes the leaky bucket function.

3. The method according to claim 1, wherein each overhead byte comprises at least a cyclic counter value which is equal in all overhead bytes of one cell block and which is incremented by one N from one cell block to another.

4. The method according to claim 1, wherein the overhead bytes comprise a transmission signal number which is incremented from one overhead byte to another within the same cell block.

5. The method according to claim 1, wherein N synchronization words are added to the composite signal at intervals of M cell blocks.

6. Method according to claim 1, characterized in that the transmission signals received over the transmission network are demultiplexed at the reception end and restored to the cell-based signal, the rate of which is adapted to said high nominal bit rate.

7. The method according to claim 2, wherein each overhead byte comprises at least a cyclic counter value which is equal in all overhead bytes of one cell block and which is incremented by one or N from one cell block to another.

8. Method according to claim 2, wherein the overhead bytes comprise a transmission signal number which is incremented from one overhead byte to another within the same cell block.

9. The method according to claim 1, wherein N synchronization words are added to the composite signal at intervals of M cell blocks.

10. The method according to claim 1, further comprising:

demultiplexing the transmission signals received over the transmission network at the reception end and restoring them to the cell-based signal, the rate of which is adapted to said high nominal bit rate.

11. The method of claim 1, wherein: said high nominal bit rate is 140 or 155 Mbits/s and said separate lower-speed transmission signals each have a bit rate of about 1.5, 2, 6 or 8 Mbits/s.

12. The method according to claim 1, wherein the multiplexing takes place byte by byte.

13. A user-network interface in a digital transmission network for a cell-based digital signal comprising cells of fixed length and having a high nominal bit rate, the interface comprising:

an input buffer means for receiving and buffering the cell-based signal;

a policing means for controlling said buffer means to adapt the rate of the received cell-based signal to the actual transmission speed of the transmission network;

a mapping means for forming cell blocks of N consecutive cells from the cell-based signal and for adding N overhead bytes to each cell block;

a first multiplexing means for multiplexing the output signal of the mapping means byte by byte into N separate output signals of about 1.5 Mbit/s, 2 Mbit/s, 6 Mbit/s or 8 Mbit/s, N being an integer which is greater than 1.

14. The interface according to claim 13, wherein the network interface further comprises a first generator means for generating empty cells;

a second generator means for generating control cells;

a combiner means for combining cells from the first and the second generator means with the rate-adapted cell-based signal before applying the signal to the mapping means.

15. The interface according to claim 14, wherein the network interface further comprises a means for mapping at least one non-cell-based synchronous digital signal to the cells; a buffer means for adapting the rate of the obtained cell-based signal and for applying the rate-adapted signal to the combiner means for combining it with the output signal of the input buffer means.

16. The interface according to claim 13, further comprising a second multiplexing means for multiplexing the output signals of the first multiplexing means into the STM frames of a synchronous digital hierarchy.

17. The interface according to claim 13, further comprising a second multiplexing means for multiplexing the output signals of the first multiplexing means into the STM frames of a synchronous digital hierarchy.

18. The interface according to claim 14, further comprising a second multiplexing means for multiplexing the output signals of the first multiplexing means into STM frames of a synchronous digital hierarchy.

19. The interface according to claim 15, further comprising a second multiplexing means for multiplexing the output signals of the first multiplexing means into STM frames of a synchronous digital hierarchy.

20. A method for establishing a user-network interface in a digital transmission network for a cell-based digital signal comprising cells of fixed length and having a high nominal bit rate, for an ATM signal, said method comprising the steps of:

adapting the rate of the cell-based signal by a policing function to an actual transmission speed lower than said nominal bit rate;

generating empty cells;

generating control cells;

combining said empty cells and said control cells with the rate-adapted cell-based signal, mapping the rate-adapted cell-based signal into a group of N separate lower-speed transmission signals for transmission over the transmission network, N being an integer higher than 1.

21. The method claim 20, wherein:said high nominal bit rate is 140 or 155 Mbits/s and said separate lower-speed transmission signals each have a bit rate of about 1.5, 2, 6 or 8 Mbits/s.

22. A user-network interface in a digital transmission network for a cell-based digital signal comprising cells of fixed length and having a high nominal bit rate, said interface comprising:

an input buffer means for receiving and buffering the cell-based signal;

a policing means for controlling said buffer means to adapt the rate of the received cell-based signal to the actual transmission speed of the transmission network;

a mapping means for forming cell blocks of N consecutive cells from the cell-based signal and for adding N overhead bytes to each cell block;

a first multiplexing means for multiplexing the output signal of the mapping means byte by byte into N separate output signals of about 1.5 Mbit/s, 2 Mbit/s, 6 Mbit/s or 8 Mbit/s, N being integer higher than 1;

a first generator means for generating empty cells;

a second generator means for generating control cells; and a combiner means for combining cells from the first and the second generator means with the rate-adapted cell-based signal before applying the signal to the mapping means.

\* \* \* \* \*